United States Patent [19]

Chiang et al.

[11] 3,956,223

[45] May 11, 1976

[54] HOT-MELT PRESSURE-SENSITIVE ADHESIVE

[75] Inventors: Joseph Shing Chiang, Skokie; Charles Bartell, Highland Park, both of Ill.

[73] Assignee: Borden, Inc., Columbus, Ohio

[22] Filed: July 1, 1974

[21] Appl. No.: 484,827

[52] U.S. Cl. .................. 260/33.6 AQ; 260/876 B; 260/880 B; 428/346; 428/355
[51] Int. Cl.$^2$ .................. C08K 5/01; C09J 7/04
[58] Field of Search..... 260/876 B, 880 B, 33.6 AQ; 428/346, 355

[56] References Cited

UNITED STATES PATENTS

| | | | |
|---|---|---|---|
| 3,239,478 | 8/1966 | Harlan | 260/876 B |
| 3,625,752 | 12/1971 | Korpman | 117/122 PA |
| 3,630,980 | 12/1971 | Russell | 260/876 B |
| 3,676,202 | 7/1972 | Korpman | 117/122 PF |
| 3,783,072 | 1/1974 | Korpman | 156/244 |

OTHER PUBLICATIONS

Morton–Rubber Technology (2nd Ed.), (Van Nostrand) (N.Y.) (July 12, 1973) pp. 530–532.

*Primary Examiner*—Donald E. Czaja
*Assistant Examiner*—H. H. Fletcher
*Attorney, Agent, or Firm*—George P. Maskas; Daniel D. Mast; George A. Kap

[57] ABSTRACT

A solvent-free pressure-sensitive hot-melt adhesive contains:
A. A block copolymer having the general configuration A—B—A wherein A is a polymer block of vinyl arene and B is a polymer block of conjugated diene,
B. A tackifying resin system,
C. A naphthenic process oil plasticizer having a naphthenic content between 52% and 75% and less than 5% aromatic by total carbon types of the process oil,
D. A curing agent,
E. A filler, and
F. An antioxidant.

The hot-melt adhesive described above can be applied to a number of backings without the use of solvents. The adhesive is rendered fluid by the use of heat and mechanical working. Adhesive tape made using the hot melt of the present formulation has all of the advantages inherent in the prior art tapes based upon solvent applied adhesives. The use of the hot-melt adhesive described above prevents air pollution which was inherent in the solvent removal step necessary in the prior art use of solvent based adhesive systems. In addition, it also raises the production rate which in the prior art was limited by the polymer dissolution rate and by the rate of evaporation of the solvent carrier.

10 Claims, No Drawings

HOT-MELT PRESSURE-SENSITIVE ADHESIVE

BACKGROUND OF THE INVENTION

The present invention is directed to pressure-sensitive hot-melt adhesives which can be applied to flexible substrates to form adhesive tapes, labels, wall coverings, bumper stickers or any other application where a pressure-sensitive adhesive is needed.

Pressure-sensitive adhesives are well-known in the art. The method of applying these adhesives leaves much to be desired, however, because the adhesives are usually applied using a solvent carrier. The solvent carrier after application is evaporated into the atmosphere creating an air pollution problem. Superimposed upon the air pollution problem was the problem that the solvents used in the application of pessure-sensitive adhesives were normally the coal and the petroleum derivatives including aliphatic and aromatic hydrocarbons. The cutting down of lead in automotive fuels forced gasoline manufacturers to switch to the use of aromatic hydrocarbons to increase the octane ratings of their gasolines. This resulted in a critical shortage of aromatic hydrocarbons for the pressure-sensitive adhesive tape manufacturers. The shortage of petroleum feed stock also resulted in shortages of other forms of solvent.

The art in the area of pressure-sensitive adhesives most closely related to the present invention includes:

| Patent No. | Inventor | Issue Date |
| --- | --- | --- |
| U.S. 3,239,478 | Harlan | 1966 |
| U.S. 3,625,752 | Korpman | 1971 |
| U.S. 3,676,202 | Korpman | 1972 |
| U.S. 3,783,072 | Korpman | 1973 |
| U.S. 2,784,587 | Chambers | 1973 |
| S. African 700,881 | Goodyear Tire | | and various mimeographed materials authored by Petershagen and others of Shell Oil Company. There is also a publication in Adhesives Age of December, 1972, pages 30–33 entitled "Thermoplastic Rubber and Hot-Melt and Solution Adhesives" bby Harlan, Luter, Petershagen and Robertson.

The Korpman patents mentioned, except for U.S. Pat. No. 3,783,072, are based upon solvent systems resulting in the evaporation of large amounts of aromatic solvents into the atmosphere resulting in both air pollution and comsumption of vitally needed automotive fuel ingredients. Another disadvantage of the solvent based adhesive systems is that they require huge drying ovens for the removal of solvent which consume appreciable amounts of energy and take up large amounts of floor space, much more in fact than apparatus involved in the actual coating of the substrate with the adhesive. On the other hand, the solventless adhesives mentioned in his U.S. Pat. No. 3,783,072 patent are all in viscotity range of 750,000 – 2,000,000 centipoises which is beyond the coating viscosity range by conventional hot-melt technique. The molten and free-flowing adhesive of our invention is able to be coated onto a web by conventional hot-melt coating devices such as a transfer roll coater, slot coater, two-roll coater, etc. The mimeographed materials and publication of Petershagen mentioned above, while disclosing broad general classes of ingredients which can be incorporated into hot-melt pressure-sensitive adhesives, do not specifically pin point the combinations or ratios of ingredients which provide the vitally balanced tape properties, such as, Panel Adhesion, 20° hold, quick-stick and adhesive strength required by the adhesive tape industry.

SUMMARY OF THE INVENTION

The present invention is directed to a solvent-free hot-melt pressure-sensitive adhesive comprising:
A. 100 parts by weight of a block copolymer having the general configuration A—B—A wherein;
  1. each A is an independently selected polymer block of a vinyl arene, the average molecular weight of the block being between about 5,000 and about 125,000;
  2. B is a polymer block of a conjugated diene, the average molecular weight of the block being between about 15,000 and about 250,000;
  3. the total blocks A being 10 to 35% of the total weight of the copolymer;
B. 50 to 200 parts and preferably 95 to 140 parts by weight of tackifying resin or mixture of tackifying resins;
C. 10 to 45 parts and preferably 15 to 35 parts by weight of a naphthenic plasticizer oil wherein the naphthenic content of the plasticizer oil based upon carbon content lies between 52 to 75% of the total carbon types;
D. 0.10 to 1.75 parts and preferably 1.0 to 1.5 parts by weight of a curing agent; and
E. 0.1 to 10 parts and preferably 1.0 to 5 parts by weight of an antioxidant.

For practical application the hot-melt has a Brookfield melt viscotity at 10 rpm between 25,000 and 150,000 centipoises at 350°F. and a viscosity at 316°F. of 45,000 to 550,000 centipoises when measured at 10 rpm and 1 rpm respectively outside of these ranges problems occur in the adhesive film formed. The above formulation provides all of the advantages in he final product found in the prior art solvent based adhesive systems, and eliminates the above mentioned disadvantages of aromatic hydrocarbon consumption and air pollution since no solvents are used in the application of the above described hot melts to a tape backing or other substrate. The huge drying ovens conventionally empoloyed in the manufacture of adhesive tapes and other pressure-sensitive adhesive backed materials are no longer required thus permitting a tremendous space savings. Furthermore, by transferring energy to the adhesive through conduction means, rather than the poorly controlled hot air convection used in the application of solvent type adhesives method, a tremendous energy saving is also achieved.

DETAILED DESCRIPTION OF THE INVENTION

The A—B—A block copolymer used in the present invention is commercially available from the Shell Oil Company and is described in the patents listed in the description of the prior art. These patents describe the vinyl arenes, the conjugated dienes, the A—B—A block copolymers made therefrom and are hereby incorporated by reference into the present application. The A—B—A block copolymer is present at a 100 parts level.

The tackifying resins which can be employed in the practice of the present invention include rosin and rosin derivatives, polyterpenes, coumarone-indene resins, phenolic modified resins, and hydrocarbon resins among other known tackifiers. The tackifier resins are present at a level of from 50 to 200 parts.

The tackifying resins are exemplified by:
Rosin plus polyterpene resins, e.g., polymerized hetapiene (from 100% rosin to 100% resin)
Glycerol esters of hydrogenated rosin
Pentaerythritol esters of hydrogenated rosin
Polyindene resins
Hydrogenated rosin
Glycerol esters of polymerized rosin
Partial esters of styrene-maleic acid copolymers
Terpene Phenolics
Oil-soluble-phenol-aldehyde resins
Piperylene-copolymerized with 2-methyl-2-butene
Hydrogenated polycyclopentadiene The copolymer of piperylene with 2-methyl butene is described in U.S. Pat. No. 3,577,398 of Pace, 1971. A number of other very useful tackifiers are also disclosed in the U.S. Pat. No. 3,577,398 and U.S. Pat. No. 3,239,478.

The plasticizing oil is used to build up the softness of the tack (quick stick) and to adjust the flow properties, and the plasticity of the hot-melt pressure-sensitive adhesive for easy processing and good dynamic properties. Moreover, those oils having a naphthenic content between 52% and 75%, and aromatic content below 5% were found to give the hot-melt pressure-sensitive adhesive better heat stability and grab tack than any other oils could. The percentage of the components of the plasticizer oil are given in weight percentage of carbon atoms present in the plasticized oil, referred to below as total carbon types. Percentage of components by total carbon types is meant the results of a Carbon Type Analysis. The Carbon Type Analysis is a graphic correlation between the refractivity intercept and the viscosity-gravity constant permitting assigning numerical percentages to the types of carbon atoms present in an oil (aromatic, naphthenic and paraffinic). These values are easily and quickly determined since the method utilizes commonly available physical properties of the oil, refractive index, density and viscosity. (Refractivity intercept = refractive index − ½ density; Viscosity-Gravity Constant is a mathematical relationship between viscosity and specific gravity). The method casts additional light on the molecular composition of the oil. The method is standard in the petroleum industry and is ASTM method D2140-63T (1963). The address of the publishing Society is 1916 Race Street, Philadelphia, 3, Pennsylvania. The plasticizer oil is present at a level of from 10 to 45 parts.

The curing agents which are employed in the practice of the present invention are diene reactive curing agents and their function is to upgrade the elevated temperature performance as well as the room temperature holding properties of the hot-melt adhesive. From 0.10 to 1.75 parts and preferably 1.0 to 1.5 of the curing agent is employed. The curing system which is employed is a heat activated curing system. This allows the hot-melt adhesive formulation to be relatively free flowing right up until a short time prior to its application on the selected substrate. Examples of the heat active curatives are the blocked isocyanates, the thiuram sulphides and the oil-soluble phenolic resins. These materials are known in the art, commercially available and are exemplified by the phenol blocked adduct of toluene diisocyanate, the ketoxime blocked adduct of aromatic or aliphatic polyisocyanate, the bis-phenol adduct of methylene bis (4-phenyl isocyanate), tetramethyl thiuram disulphide, and tetramethyl thiuram tetra sulphide. The oil soluble phenolics are exemplified by Amberol ST-137 which is an oil soluble elastomer-reactive heat-curing octyl phenol formaldehyde resin. It has a melting point of approximately 80°C. and is sold commercially by Rohm and Haas Company. Other phenolics include those described in the U.S. Pat. No. 3,165,496 and offered commercially by Schenectady Chemicals, Inc. These include the bromomethylated heat-curing phenol formaldehyde resins. The amount of the heat reactive curing agent in the hot-melt adhesive is critical. If too small of an amount is used, its effect will not be sufficient to significantly increase the cohesive strength of the final adhesive film; if the level is too high, the viscosity of the hot-melt during application will increase to the point where practical application by a hot-melt coater is impossible. A calendar with tremendous driving power is then needed and which is beyond our concern here. According to this invention, the Brookfield melt viscosities of the hot-melt adhesives at 350°F. lies between 25,000 centipoises to 150,000 centipoises with a preferred coating range at 350°F. of 25,000 to 75,000 centipoises.

The antioxidants which are used in the practice of the present invention are those well-known in the rubber and related industries. Their function is to protect the ingredients of the hot-melt system from oxidation and thermal degradation due to the presence of oxygen, heat and shear forces. Those which can be used in the present system include the known phenol derivatives, amine derivatives, ester derivatives, organic phosphites, organic phosphates, and the dithiocarbamates. More specific examples are 2,6-di-tert-butyl-4-methyl phenol, phenyl-B-napthylamine, dilauryl thio-dipropionate, di-(stearyl) pentaerythritol diphosphite, and zinc dialkyl dithiocarbamates. The antioxidants are present at a level of from 0.5 to 10 parts and preferably 1.0 to 5 parts.

DESCRIPTION OF THE PREFERRED EMBODIMENTS

The preferred block copolymer used in the practice of the present invention is a thermoplastic and elastomeric block polymer of the structure A—B—A, wherein A is a thermoplastic polymer block derived from styrene, i.e., polymerized from styrene or styrene homologues, and B is an elastomeric polymer block derived from isoprene, i.e., polymerized from isoprene either alone or in conjunction with a small proportion of other monomers, and about 0—25% of an elastomer selected from homopolymers and random copolymers wherein one of the components is a diene. In the block copolymer, the individual A blocks have a number average molecular weight of at least about 7,000 preferably in the range of about 12,000 – 30,000 and the A blocks constitute about 10–35 and preferably about 12–25 percent by weight of the block polymer. The above described A—B—A block polymer may be used as the sole elastomeric constituent of the adhesive and it is preferred that the elastomers consist essentially of this type of block polymer. However, the adhesive may include 0–50 percent by weight of the thermoplastic elastomeric component of an additional more conventional diene elastomer such as natural rubber, or polymers based on butadiene-acrylonitrile (NBR rubber), butyl rubber, or the like, and also may include other block polymers based on such diene elastomers. The block copolymer is present at a 100 parts level.

The preferred tackifying resin is a mixture of copolymer of piperylene and 2-methyl-2-butene with a polyindene resin having a softening point between 80° and 135°C. The piperylene to polyindene ratio of the copolymer has a value of 6:1 to 3:1 respectively. The tackifying resin is preferably present at a level of from 95 to 140 parts.

The preferred naphthenic plasticizer oil is one having a naphthenic content of from 52% to 75%, an aromatic content of from 0 to 5%, and a paraffinic content of from 25 to 48 parts. The three components in the plasticizer oil are determined by the carbon analysis set forth above. The plasticizer oil is preferably present at a level of from 15 to 35 parts.

The preferred curing agents are the heat curing octyl phenol formaldehyde resins, octyl substituted phenolic curing resins, the bromo-methyl alkylated heat activated phenolic curing resins and the blocked isocyanate curing agents. The curing agent is preferably present at a level of from 1.0 to 1.5 parts.

In the hot-melt process for applying pressure-sensitive adhesive to a substrate, stringent oxidation conditions are present and it is preferred that known synergistic combinations of antioxidants be used. The preferred antioxidant systems are the phenol derivatives and the organic sulphides, such as the 2,2 methylene bis (4-ethyl-6-butyl phenol) and the di-(stearyl) pentaerythritol diphosphite, or the dithiocarbamates, such as Butyl Zimate. The antioxidant is preferably present at a level of from 1 to 5 parts.

The Brookfield melt viscosities of the hot-melt adhesives at 350°F. are between 25,000 centipoises and 150,000 centipoises, and/or 45,000 centipoises to 550,000 centipoises at about 316°F. measured with Brookfield Thermocel Viscometer at 10 rpm and 1.0 rpm respectively. For those adhesives with curatives, the 300°F. to 325°F. temperature range is a preferred processing temperature range. Coatings shall be made at this temperature for no more than 60 minutes after the curatives are added into the adhesive. With the manufacturing processes described below, this time dependency character shall not be a problem.

The following examples are illustrative of preferred modes of practicing the present invention. In the examples, as elsewhere in the specification and claims, all parts are by weight unless otherwise indicated (Molecular weights refer to number average molecular weights). Standard PSTC tests referred to below are found in Test Methods for Pressure Sensitive Tapes, published by the Specifications and Technical Committee of the Pressure Sensitive Tape Council, 1201 Waukegan Road, Glenview, Illinois, 60025 (1963 revised 1970).

In the following examples, the compositions employed identified by their trademarks are as follows:

Kraton 1107 is a thermoplastic elastomeric A—B—A block copolymer comprising an elastomeric centerblock B of a conjugated diene (isoprene) and thermoplastic end block A of a vinyl arene (styrene). The styrene content is around 14% of the total weight of the copolymer. Kraton has an intrinsic viscosity of 1.13 when measured in toluene solution. It is commercially available from Shell Chemical Company.

Wing Tack 95 is a synthetic tackifier resin polymerized from the aliphatic petroleum stream ($C_5$–$C_8$) containing a major proportion of piperylene and isoprene with the balance being cyclopentadiene, methyl butadiene and so on. This resin is offered commercially by Goodyear Tire & Rubber Company.

Piccoumaron 450L is a synthetic hydrocarbon resin which is selectively polymerized to yield highly aromatic resin product Its main chain backbone structure is (poly) indene. This resin has a softening point of 100°C. and is commercially available from Hercules Company.

Tufflo 6054 is a hydrogenated process oil consisting of 53% naphthenic carbons, 43% paraffinic carbons, 4% aromatic carbons, and having a viscosity SUS/100°F. of 587. It is offered commercially by Atlantic Richfield Company.

Heat Active Phenolic Bakelite 1634 is a heat reactive resin synthesized from para-tert-butyl phenol with reactive methylol end groups. It is commercially available from Union Carbide Company.

Mondur S Blocked Isocyanate is a phenol blocked tolune diisocyanate adduct, with an NCO content of about 11.5% – 13.5%. This material is offered commercially by Mobay Company.

Tufflo 6204 is a hydrogenated process oil consisting of 52% naphthenic carbons, 46% paraffinic carbons, 2% aromatic carbons, and having a viscosity SUS/100°F. of 1965.

Piccotac B is a synthetic hydrocarbon resin derived from a specially refined stream ($C_5$–$C_8$) to achieve light color. It consists of controlled types and amounts of olefins and diolefins to give a softening point of 100°C. It is commercially available from Hercules Company.

Akron M 90 is a synthetic hydrocarbon resin with a softening point 90° ± 5°C. produced by the catalytic polymerization and subsequent hydrogenation of styrene, vinyl toluene, and indene types from distilates of cracked petroleum stocks. It is commercially available from Arakawa Company.

Amberol ST-137 is a heat active octyl phenol formaldehyde resin. It is oil soluble and has a melting point of approximately 80°C. It is sold commercially by Rohm and Haas Company.

TESTING METHODS

1. The standard PSTC tests referred to in this application are found in Test Method Manual published by the Pressure Sensitive Tape Council (1963 revised 1970).

2. The method of determining carbon types in process oil can be found in ASTM Test Manual, Method D2140-63T (1963).

3. The 20° Hold Test is used by many tape companies in the United States to define certain tape characteristics corresponding to its performances in the field. A brief description of the test is as follows:

First:
Apply a half-inch wide tape specimen against a cleaned stainless steel bar of half-inch square cross area at a right angle. This results in a smooth contact area of ½ × ½ inch square which is subsequently rolled over back and forth by a 4½ pound rubber covered roller, then place the bar with the applied sample on a supporting rack which supports the bar at an angle of 20° off the vertical. Attach a 400 gram weight to the testing sample. Observe and record the time in minutes for the tape to fall from the bar.

The examples of this invention teach the manufacture of hot-melt pressure-sensitive adhesives containing a conventional heat reactive curative for diene polymers which is added to upgrade the holding power of the adhesive. Even with the curative, the adhesive can be processed with a conventional hot-melt two-roll coater. The process for the manufacture of hot-melt adhesives, used in the following examples is as follows:

The A—B—A copolymer is first added into a batch type dry mixer, e.g. a double arm mixer. The plasticizer is then sprayed over above the block copolymers during the mixing stage. This ensures that the previously aggolmerated crumb rubbers be separated back into its free-flowing crumb shape. This step takes roughly 8 to 10 minutes in a low shear mixer.

Then, the antioxidant, filler and curative are added into the mixer either in that order or in a pre-blended mixture form. Subsequently, the tackifier resins are added. Mixing is continued for another 5 to 10 minutes. The entire mixing process is done at room temperature.

The dry mix is then fed into an extruder for melting and further mixing. The temperature of the extruder barrel, the screw, the adapter and the die plate are all controlled at 300°F. during this melting stage. The molten adhesive (at 300°F.) is extruded into an intermediate tank where vacuum and final mixing are applied. Also, the melt temperature of the molten adhesive is raised to about 315°F. It later is pumped through a closed pipe to a closed feeding fountain which controls the amount of the adhesive, by pressure, to the two-roll coater.

The two-roll coater is a conventional one except that the stainless-steel doctor roller is heated to 320°F. and the back-up roller is cooled below 100°F. The tape backing is coated with adhesive on the two-roll coater. The adhesive coated tape is wound up at rewind station and is subsequently slit into ordinary tape rolls.

EXAMPLE I 100 parts of a block copolymer (Kraton 1107) was charged into a dry mixer (Day Mixer) and was mixed for about two minutes at room temperature. Then, 30 parts of a plasticizer (Tufflo 6054) was added. Mixing was continued for an additional 8 minutes. At the end of this 8 minute cycle, 5 parts of an anti-oxidant (Butyl Zimate), 8 parts of a filler (Titanium Dioxide), 20 parts of tackifying resin No. 2 (Piccoumaron 450L) and 100 parts of tackifying resin No. 1 (Wing Tack 95) were added in that order. The mixture was mixed for a total of 15 minutes at room temperature. Then the dry mix was fed into an extruder with a 4½ diameter, 30:1 length to diameter ratio and with its temperature controlled at 300°F. from the feeding zone to the extrusion die for melting and for further mixing. The viscosity at 350°F. was 36,000 cps using the Brookfield Thermocel Viscometer. The molten adhesive was extruded into a holding tank where it was kept at about 315°F. and was subsequently fed to a two-roll coater (the Leveron Coater by Waldron Co.) through an enclosed fountain die. Coating was applied to a pre-released crepe paper backing, and was controlled at 29 pounds per ream. Standard PSTC tests were applied and the test results are as follows:

| | |
|---|---|
| Panel Adhesion, PSTC No. 1 oz/in | 47 |
| 90°Tack, PSTC No. 5 oz/in | 26 |
| Rolling Ball Tack, PSTC No. 6 inches | 0.7 |
| 20° hold, Mystik No. 14 minutes | 54 |

EXAMPLE II

Example I was repeated except that an additional 1.25 parts of a curative (Rohm Haas Amberol ST-1ST-137) was added into the dry mix. Coating was also made at 29 pounds per ream on a pre-released crepe paper backing. Again, the PSTC test methods were applied and the results are as follows:

| | |
|---|---|
| Panel Adhesion, PSTC No. 1 oz/in | 42 |
| 90°Tack, PSTC No. 5 oz/in | 20 |
| Rolling Ball Tack, PSTC No. 6 inches | 0.9 |
| 20° hold, MYSTIK No. 14 min. | 96 |

EXAMPLE III

One hundred parts of tackifying resin No. 2, Wing Tack 95, and 30 parts of plasticizer, Tufflo 6054, were melted in a Sigma Blade mixer (by Reedco Co.) at about 325°F for 15 minutes. Nitrogen atmosphere and slow agitation were introduced during this melting period. Then 100 parts of the block copolymer, Kraton 1107, and 5 parts of the antioxidant, the Butyl Zimate, were added. After the mixture was mixed for approximately 30 minutes, 20 parts of resin, No. 2 Piccoumaron 450L was added, and the mixing was continued for about 15 minutes. The last ingredient, 1.75 parts of a curative (Bakelite 1634) was then added, and the mixing was continued for 5 more minutes. By then, the adhesive was ready to coat and was transferred into a pre-heated fountain of a knife over roll coater. The viscosity at 350°F. was 39,000 cps using the Brookfield Thermocel Viscometer. Coating was made around 320°F. and at about 29 pounds per ream. The coated tape was subjected to PSTC testing and the results are as follows:

| | |
|---|---|
| Panel Adhesion, PSTC No. 1 oz/in | 57 |
| 90° Tack, PSTC No. 5, oz/in | 13 |
| Rolling Ball Tack 6, PSTC inches | 0.7 |
| 20° hold, MYSTIK No. 14, min. | 53 |

EXAMPLE IV

A hot-melt pressure-sensitive tape was prepared as described in Example II with the only difference in formula being the curative. Instead of the heat active phenolic resin, the heat active isocyanate resin was used here. The viscosity at 325°F. was 74,000 cps. The tape produced a similar satisfactory results as described in Example II.

EXAMPLE V, VI, VII, VIII & IX

Hot-melt pressure-sensitive tapes were prepared by the same process as described in Example III. The adhesive composition were formulated as described in the following table:

| | V | VI | VII | VIII | IX |
|---|---|---|---|---|---|
| Kraton 1107, parts | 100 | 100 | 100 | 100 | 100 |
| Wing Tack 95 | 75 | 64 | 133 | — | — |
| Piccoumaron 450L | 37.5 | 20 | 30 | 20 | 20 |
| Tufflo 6054 | 37.5 | 16 | 45 | 30 | 30 |
| Butyl Zimate | 3 | 3 | 3 | 3 | 3 |
| Piccofex B | — | — | — | 100 | — |
| Arkon M 90 | — | — | — | — | 100 |

Standard PSTC tests were applied and the results are as follows:

|  | V | VI | VII | VIII | IX |
|---|---|---|---|---|---|
| Panel Adhesion, PSTC No. 1 oz/in | 36 | 33 | 42 | 42 | 32 |
| 90° Tack, PSTC No. 5 oz/in | 16 | 13 | 10 | 14 | 17 |
| Rolling Ball Tack, PSTC No. 6 inches | 0.5 | 0.5 | 0.6 | 0.9 | 0.7 |
| 20° hold, MYSTIK No. 14 min. | 4 | 7 | 10 | 38 | 9 |

EXAMPLE X

The hot-melt pressure-sensitive tapes were prepared by the same processes as described in Example II. The adhesive composition was formulated as follows:

| Kraton 1107, parts | 100 |
|---|---|
| Wing Tack 95 | 100 |
| Piccoumaron 450L | 20 |
| Butyl Zimate | 3 |
| Tufflo 6204 | 30 |

The properties of the tapes using the formulated adhesives were as follows:

| Panel Adhesion, PSTC No. 1 oz/in | 47 |
|---|---|
| 90° Tack, PSTC No. 5 oz/in | 22 |
| Rolling Ball TAck, PSTC No. 6 inc. | 0.7 |
| 20° hold, MYSTIK No. 14, min. | 146 |

We claim:

1. A solvent-free hot-melt pressure-sensitive adhesive comprising:
   A. 100 parts by weight of a block copolymer having the general configuration

A—B—A wherein,
   1. each A is an independently selected polymer block of a vinyl arene, the average molecular weight of the block being between about 5,000 and about 125,000;
   2. B is a polymer block of a conjugated diene, the average molecular weight of the block being between about 15,000 and about 250,000;
   3. the total blocks A being 10 to 35% by weight of the copolymer;
   B. 50 to 200 parts by weight of tackifying resin;
   C. 10 to 45 parts by weight of naphthenic plasticizer oil wherein the naphthenic content of the plasticizer oil based upon carbon content lies between 52% and 75% of the total aromatic, paraffinic and naphthenic content of the oil;
   D. 0.1 to 1.75 parts by weight of a heat-activated curing agent; and
   E. 0.1 to 10 parts by weight of an antioxidant.

2. The composition of claim 1 wherein the adhesive layer, which is especially adapted for application to a tape, contains from 0.5 to 5 parts by weight of an antioxidant selected from the group consisting of phosphite derivatives, metal dithiocarbonates, phenol derivatives, and amine derivatives.

3. The composition of claim 1 wherein from 95 to 140 parts by weight of the tackifier resins are present.

4. The composition of claim 1 wherein the plasticizer is present at a level of from 15 to 35 parts by weight.

5. The composition of claim 1 where from 1 to 5 parts by weight of an antioxidant are present.

6. The composition of claim 1 wherein the paraffinic content of the plasticizer is from 25% to 48% and the aromatic content is less than about 5%.

7. The composition of claim 1 containing 1 to 50 parts by weight of a filler.

8. The composition of claim 1 wherein the adhesive has Brookfield melt viscosities at 10 rpm between 25,000 to 150,000 centipoises at 350°F. and 45,000 to 550,000 centipoises at 316°F. and at 10 rpm to 1 rpm respectively.

9. The composition of claim 1 wherein the adhesive is of a coatable viscosity for 60 minutes or better at 316°F. after a curative is added.

10. The composition of claim 1 wherein the A polymer block is selected from styrene, styrene homologues and mixtures thereof and the B polymer block is derived from isoprene, the Brookfield melt viscosity of the composition at 350°F being in the range of 25,000 to 150,000 cps measured with Brookfield Thermocel Viscometer at 10 rpm.

* * * * *